March 12, 1957 LA VERNE R. PHILPOTT 2,785,301

DIVERSITY AMPLIFICATION FOR SUPERHETERODYNE RECEIVERS

Filed March 5, 1946

Inventor
LA VERNE R. PHILPOTT

By M. A. Hayes

Attorney

United States Patent Office 2,785,301
Patented Mar. 12, 1957

2,785,301

DIVERSITY AMPLIFICATION FOR SUPERHETERODYNE RECEIVERS

La Verne R. Philpott, Washington, D. C.

Application March 5, 1946, Serial No. 652,203

3 Claims. (Cl. 250—20)

(Granted under Title 35, U. S. Code (1952), sec. 266)

This invention relates in general to a superheterodyne receiving system, and in particular to system for enabling unimpaired radio operation through manmade interference.

Since deliberate interfering signals are perhaps more frequently encountered in radar than in any other kind of radio operations, the invention will herein be described as applied to a radar system; it being understood, however, that its applicability is not limited thereto.

In the ordinary radar system the transmitter and receiver are so constructed as to be tunable over a band of frequencies to thereby provide a measure of freedom from interference. That is, interference encountered at one frequency can be avoided by tuning the system to a new frequency of operation.

If, however, interference is encountered from a signal or combination of signals which are in or near the band over which the receiver can operate and which contain or produce frequency components equal to receiver intermediate frequency, avoiding the interference by simply tuning the system becomes an impotent remedy since the I. F. component in the interference is always present and is ordinarily so intense as to disable the I. F. amplifier of the receiver.

Interference of the foregoing character can be readily generated in a number of well known ways. For example, the carrier signal of the interference transmitter could be modulated by a signal equal to the intermediate frequency of the radar receiver. In this case the detector action present in the mixer stage of the radar receiver will be sufficient to detect the modulation on the interference signal. Alternatively, a pair of interference signals having a frequency separation equal to the intermediate frequency of the radar receiver could be used.

In accordance with the broader aspects of the invention, I contemplate a superheterodyne receiver in which the frequency mixing circuit is coupled to the video amplifier by means of a plurality of I. F. amplifier channels and associated detection stages connected in parallel. The I. F. channels are tuned to different frequencies. Consequently, to provide simultaneous operation of the I. F. channels, a similar number of tunably operable local oscillators are associated with the mixing circuits. A "lock out" detector is associated with each I. F. channel and arranged so as to render its respective I. F. channel inoperative when the signal intensity therein exceeds a predetermined value. This value is adjusted so that it may only be exceeded during the presence of an interference signal. To this end it should be noted deliberate interference signals are usually much more intense than any other incoming signal in an ordinary radar receiver. Thus discrimination between a desirable incoming signal and a deliberate interference signal is most readily accomplished on a comparative signal intensity basis.

An object of this invention is to provide a superheterodyne receiving system which is adapted to render strong interfering signals having a frequency component equal to the intermediate frequency of the receiver impotent.

Another object of this invention is to provide a superheterodyne receiving system in which amplification takes place in parallel I. F. channels; each of such I. F. channels operating at a different intermediate frequency.

A further object of this invention is to provide a means for rejecting all signals in the intermediate frequency amplifiers which exceed a preset intensity.

Other objects and features of the present invention will become apparent upon a careful consideration of the following detailed description when taken together with the accompanying drawings. For simplicity, the diagrams and description will be restricted to a superheterodyne receiving system having two parallel channels of I. F. amplifiers and associated circuits.

Figure 1:
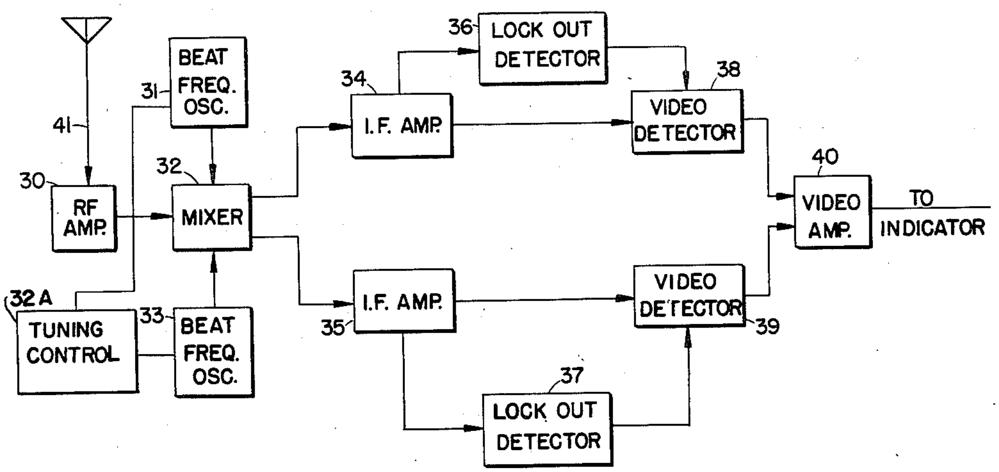
Fig. 1 is a block diagram illustrating one embodiment of the invention.

In Fig. 1, to which reference is now had, a superheterodyne receiving system constructed as taught by the invention is shown. As indicated in this figure, the receiving system of the invention includes a pair of local oscillators 31 and 33 coupled to a suitable frequency mixing circuit 32. Both oscillators and the mixing circuit may be of conventional design. The oscillators 31 and 33 are each so tunably operable as by a tuning control 32-A that their respective instantaneous frequencies are continually held at a fixed frequency separation. Thus, the joint action of oscillators 31 and 33 is such that all incoming signals impinging on the antenna 41 are simultaneously heterodyned to two distinct intermediate frequencies. These intermediate frequency outputs from the mixing circuit 32 are coupled respectively to a common video amplifier channel 40 by way of a pair of I. F. amplifier channels 34 and 35 and a pair of detectors 38 and 39 connected in parallel.

In the circuit adjustments, the upper channel of this split I. F. system, comprising I. F. amplifier 34 and detector 38, is tuned to the beat frequency difference between the incoming signal and the signal of the local oscillator 31. The lower channel, comprising I. F. amplifier 35 and detector 39, is tuned to the beat frequency difference between the incoming signal and the local oscillator 33. In this manner the I. F. system has been split into two frequency channels to thereby render interference signals of the foregoing class impotent.

For purposes of illustration let it be assumed that the parameters, via tuning of local oscillators 31 and 33 are such that the I. F. frequency of the upper channel 34 is 25 megacycles and that of the lower channel 35 is 40 megacycles. Then when the frequency of separation between a pair of incoming interference signals is 25 megacycles the upper channel 34 will be successfully jammed. The lower channel 35 however is left free to operate normally. To eliminate the effect of the interference signal from the input of the video amplifier 40, "lock out" detectors 36 and 37 are associated respectively with each I. F. channel. The purpose of these "lock out" detectors is to render the I. F. channel it is associated with unresponsive when the signal therein exceeds a predetermined value. Such is the case when a strong interference signal is present. Consequently in the foregoing case, the presence of a jamming signal in the upper channel would cause the operation of "lock out" detector 36, which in turn would block the interference signal from the the input to the video amplifier 40.

Thus, it will be recognized that jamming of the receiver of this invention by methods herein disclosed is impossible. Additionally, if one or both of the two incoming signals are frequency modulated so that their beat frequency difference swings periodically from 25 to 40 megacycles, jamming of the present receiver will not result since one of the two I. F. channels will always be open.

Figure 2:
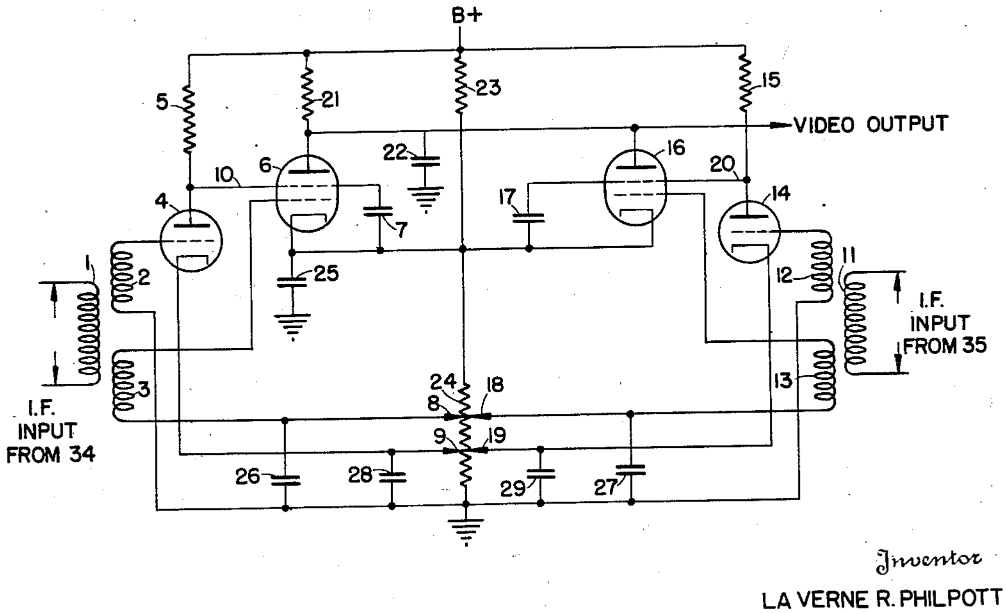
Fig. 2 is a schematic diagram illustrating in detail a portion of the circuit shown in Fig. 1.

In Fig. 2 the two video detectors 38 and 39 and the two "lock out" detectors 36 and 37 are shown in detail. The video detectors comprise tubes 6 and 16 arranged so as to provide plate circuit detection. To this end tubes 6 and 16 are equipped with a single plate load resistance 21 and I. F. by-pass condensers 22 and 25. The I. F. input to these tubes is introduced by means of the secondary windings 3 and 13 of transformers 1 and 11 respectively. The "lock out" detectors comprise tubes 4 and 14 each having a separate plate load resistor 5 and 15 respectively, which also serve as screen dropping resistors for video detector tubes 6 and 16. Input to these tubes is introduced by means of the secondary windings 2 and 12 of transformers 1 and 11 respectively.

The operational bias for tubes 6 and 16 is adjusted respectively by the movable arms 8 and 18 of potentiometer 24, the resistance of which is connected in series with resistance 23 between B+ and ground. Movable arms 8 and 18 which are provided with I. F. by-pass condensers 26 and 27 respectively are adjusted so that detector tubes 6 and 16 operate just at cut-off potential. Similarly the bias on "lock out" detectors 4 and 14 is adjusted by movable arms 9 and 19 of potentiometer 24. Movable arms 9 and 19 which are provided with I. F. by-pass condensers 28 and 29 respectively are adjusted so that tubes 4 and 14 operate in the cut-off region. Under normal signal conditions tubes 4 and 14 remain nonconducting and detector tubes 6 and 16 both remain free to operate in their normal manner. When, however, the intensity of the signal introduced by either transformer 1 or 11 is sufficient to drive tube 4 or 14 conducting the screen grid voltage for the corresponding video detector tubes 6 and 16 respectively drops and that tube becomes unresponsive. To prevent I. F. signals being applied to the "lock out" detector tubes from being coupled through the screen grids of the corresponding video detector tube to the output, I. F. by-pass condensers 7 and 17 are connected to the screens of tubes 6 and 16.

Although I have shown and described only one specific embodiment of the invention, I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. In a superheterodyne receiving system, a frequency mixing circuit, a pair of local oscillators coupled to said mixing circuit and so tunably operable that their respective instantaneous frequencies are continually held at a fixed frequency separation, each of the local oscillator signals serving to heterodyne in said mixing circuit with an incoming signal of predetermined frequency to produce a respective one of a pair of distinct intermediate frequency signals, a pair of intermediate frequency amplifier channels each tuned to receive one of said intermediate frequency signals, each of said intermediate frequency channels including a signal detecting means, means responsive to the signal intensity in its respective intermediate frequency channel for rendering said signal detecting means inoperative when said signal intensity exceeds a predetermined value, and a common amplification channel receiving the outputs of said intermediate frequency channels.

2. In a superheterodyne receiving system, a frequency mixing circuit, a plurality of local oscillators coupled to said mixing circuit and so tunably operable that their respective instantaneous frequencies are continually held at fixed frequency separations, each of the local oscillator signals serving to heterodyne in said mixing circuit with an incoming signal of predetermined frequency to produce a respective one of a plurality of distinct intermediate frequency signals, a plurality of intermediate frequency amplifier channels each tuned to receive one of said intermediate frequency signals, each of said intermediate frequency channels including a signal detecting means, means responsive to the signal intensity in its respective intermediate frequency channel for rendering said signal detecting means inoperative when said signal intensity exceeds a predetermined value, and a common amplification channel receiving the outputs of said intermediate frequency channels.

3. In a radar system including adjustably tunable transmitter means, a superheterodyne receiver comprising a radio frequency input circuit, a mixing circuit coupled to the output of said radio frequency circuit, a first and second local oscillator each coupled to said mixing circuit and tunably operable so that their respective instantaneous frequencies are continually held at a fixed frequency separation, each of the local oscillator signals serving to heterodyne in said mixing circuit with incoming signals of predetermined frequency to produce a respective one of distinct signals of first and second intermediate frequencies, first and second amplifier channels tuned to receive respectively said first and second intermediate frequencies, each of said channels including a signal detecting means, means responsive to the signal intensity in its respective channel for rendering said signal detecting means inoperative when said signal intensity exceeds a predetermined value, and means for adding the video frequency signal outputs of said detector means.

References Cited in the file of this patent

UNITED STATES PATENTS

| | | |
|---|---|---|
| 1,563,644 | Nichols | Dec. 1, 1925 |
| 1,876,159 | Young | Sept. 6, 1932 |
| 2,070,354 | Brand | Feb. 9, 1937 |
| 2,123,221 | Worrall | July 12, 1938 |
| 2,269,011 | Dallos | Jan. 6, 1942 |
| 2,303,493 | Purington | Dec. 1, 1942 |
| 2,362,958 | Sandretto | Nov. 14, 1944 |
| 2,364,863 | McLaughlin | Dec. 12, 1944 |
| 2,384,456 | Davey | Sept. 11, 1945 |

FOREIGN PATENTS

| | | |
|---|---|---|
| 185,133 | Great Britain | Aug. 17, 1922 |